F. G. LINDSAY.
STORE COUPON CHECK.
APPLICATION FILED JULY 26, 1919.
1,379,455.
Patented May 24, 1921.
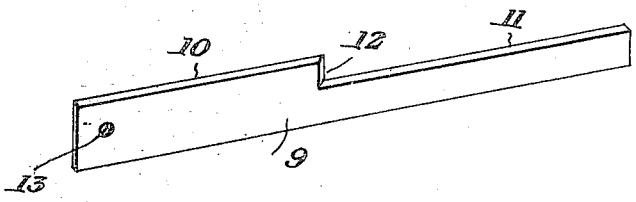

UNITED STATES PATENT OFFICE.

FRANKLIN G. LINDSAY, OF DUNBAR, PENNSYLVANIA, ASSIGNOR TO MARDORFF PRINTING COMPANY, INC., OF BROWNSVILLE, PENNSYLVANIA.

STORE COUPON-CHECK.

1,379,455.	Specification of Letters Patent.	Patented May 24, 1921.

Application filed July 26, 1919. Serial No. 313,455.

*To all whom it may concern:*

Be it known that I, FRANKLIN G. LINDSAY, a citizen of the United States, residing at Dunbar, in the county of Fayette and State of Pennsylvania, have invented new and useful Improvements in Store Coupon-Checks, of which the following is a specification.

This invention has reference to improvements in store coupon checks.

Ordinarily such classes of coupon checks comprise a sheet that constitutes a due bill, a merchant's stub and coupons between the bill and stub. The stub is detached by the merchant and the remainder of the sheet is retained by the person to whom the check has been issued after a first purchase has been made, and the amount of this purchase is indicated on the sheet by the merchant punching one of the coupons or a block in the coupon sheet that has indicated thereon the said amount. This method is entirely unsatisfactory to the merchant as he does not retain in his possession the coupons, and consequently not having evidence of the amount of merchandise yet payable on the check, finds it difficult to keep his books properly balanced.

My invention is in the nature of an improvement upon the store or coupon check upon which I was issued United States Letters Patent No. 948,178 on February 1, 1910, and is designed to provide means whereby coupons, at the first and subsequent purchase of merchandise may be detached from the check proper and retained in the cash drawer of the merchant so that his day's sales may be properly recorded and his books accurately balanced.

The drawing illustrates in Figure 1 thereof a coupon check in accordance with this invention and in Fig. 2 thereof the implement employed for severing the coupons.

The checks are printed in book form, that is, a number of checks are printed on each page in a book, but, in the drawings only one of the checks is illustrated.

A merchant makes agreement with a concern whereby checks issued by the merchant to employees of the concern will be honored by the concern. The checks may be secured by staples that pass through openings in one end of each of the checks. The sheet constituting the check has upon its fixed end a stub that is indicated by the numeral 5. On this stub is printed the number of the check, a space for the date on which the check is to be issued, a number to indicate the number of checks previously given to the person to whom the check is to be issued and an agreement whereby the maker agrees to assign a certain amount of the wages owed him by a certain company to the merchant. In addition to this, space is left for the signature of the maker, witnesses, etc. The merchant's stub 5 is separated from the coupon space 6 of the check by a perforated line 7. The coupon space is divided into blocks each of which having inscribed therein a numeral. These numerals may indicate cents or dollars and aggregate the amount for which the check is issued. Of course, different checks are issued for different amounts. The blocks in the coupons illustrated in Fig. 1 of the drawing have imprinted therein the numerals from 1 to 400 indicating that the aggregate amount of the check totals $4. The numbers are arranged consecutively in columns which are vertically arranged, the first number, 1, being at the upper left hand corner, number 2 appearing directly below that and so on.

Formed with the couponed sheet of the check is the due bill which is indicated by the numeral 8. The due bill has imprinted thereon the number of the check, a space for the date, a space for the name of the person to whom the check is issued, the number of the checks granted such person and has imprinted thereon the face value of the check, the name of the mercantile company issuing the check, the serial number of the check and a space for the signature of the merchant or his agent.

A cutting implement, such as illustrated in Fig. 2 of the drawings is retained by the merchant. This implement may be constructed of any desired material, metal preferred, and comprises a flat plate 9 having one of its edges sharpened, its said edge being cut away at approximately the central portion thereof so that in reality three cutting edges are provided, the edge at the widened portion of the plate being indicated by the numeral 10, at the narrow portion by the numeral 11 and at the shoulder between the narrow and wide portions by the numeral 12. The cutting implement 9 at its widened end is provided with an opening 13 whereby the improvement may be suspended from a nail or like support.

The dark line 14 on the check in Fig. 1 through the first two columns thereof, is, for the purpose of illustration designed to indicate the first purchase made by the holder of the check. This, it will be noted, ends at the block 30, indicating that the holder has purchased thirty cents' worth of merchandise. The merchant's stub, together with the detached portion of the coupons are retained by the merchant, the remainder of the check being retained by the purchaser. The merchant thus knows that he has given out thirty cents' worth of products to the person holding the check which is numbered 444 and which has the date applied thereon as well as the total value of the same. Therefore he knows that he is liable for merchandise for the remainder of the check, that is the difference between thirty cents and four dollars. The second purchase of merchandise by the holder of the check is indicated by the second heavy lines in Fig. 1 and indicated by the numeral 15. The block detached is numbered 135 which, if the same were the first purchase would indicate that $1.35 worth of merchandise had been secured, but being the second purchase the first purchase of 30¢ must be deducted therefrom, therefore the second purchase amounts to $1.05. This amount is determined by comparing the check held by the purchaser and the stub and detached portion of the check held by the merchant. The second strip is placed with or attached to the stub and portion of the check held by the merchant. The record of further purchases is kept by further detaching the blocks of the check and placing the same with those already held by the merchant, and in this manner he can readily indicate the total amount of sales or the total amount of merchandise dispensed during the day.

In the ordinary couponed or store checks, such as that referred to in my Patent No. 948,178, the merchant has nothing to show for the sales or for the merchandise disposed of but by the couponed checks, as the said checks, as previously stated, are punched and the whole of the check, that is the due bill portion and the coupon portion is retained by the holder of the check, the merchant only retaining his stub.

Having thus described the invention, what is claimed as new, is:—

A store coupon check comprising a merchant's stub, a due bill, and coupons between the stub and due bill, said coupons being arranged in blocks formed by vertical and transverse lines to constitute vertically arranged columns in which the units of the sum total for which the check is made are successively imprinted, the smallest unit being arranged in the upper block next to the merchant's stub, and the largest unit being arranged in the lower block of the last column next to the due bill, the coupon sheet designed to be detached by severing the coupon sheet on the vertical divisions of the columns and on the transverse division at the lower edge of the block in which there is designated the unit indicating the sum of a purchase drawn by the holder of the due bill from a merchant, the due bill and the portion of the severed coupons being retained by the holder and maker of the check, while the stub and the remaining coupons thereon being retained by the merchant, whereby both the merchant and the maker of the check will have knowledge of the transaction, and additional coupons detached from the sheet held by the maker of the check designed to be attached to or arranged with the coupons on the stub held by the merchant, whereby both parties to the transaction will have knowledge of the sum still due the holder of the check and the amount payable thereon by the holder of the stub and detached coupons.

In testimony whereof I affix my signature.

FRANKLIN G. LINDSAY.